G. W. BENTON.
SHOVEL.
APPLICATION FILED JULY 29, 1911.

1,012,972.

Patented Dec. 26, 1911.

WITNESSES
Henry H. Babcock.
E. M. Babcock.

INVENTOR
George W. Benton
by
W. H. Babcock & Son
Attorneys

COLUMBIA PLANOGRAPH CO., WASHINGTON, D. C.

UNITED STATES PATENT OFFICE.

GEORGE W. BENTON, OF CONNEAUT, OHIO.

SHOVEL.

1,012,972.  Specification of Letters Patent.  Patented Dec. 26, 1911.

Application filed July 29, 1911. Serial No. 641,259.

*To all whom it may concern:*

Be it known that I, GEORGE W. BENTON, a citizen of the United States, residing at Conneaut, in the county of Ashtabula and State of Ohio, have invented certain new and useful Improvements in Shovels, of which the following is a specification.

This invention is an improvement on the subject matter of the Mikkola Patent #629,456 though not exclusively confined thereto.

It more particularly concerns the ferrule and the means of attaching the same to the handle.

Shovel manufacturers, according to individual preference use generally one or the other of the three following forms of ferrule or handle socket: to wit, first a tubular ferrule surrounding a prong of the shovel blade which is driven into the wood of the handle within said ferrule, said parts being nailed, screwed or riveted in place; secondly front and back straps projecting from the shovel blade receiving the end of the handle between them and fastened by rivets thereto; thirdly the open back form having the ferrule integral with the shovel blade and the rivets passing laterally through the handle.

This present invention has for its object to combine the strength and advantages of the tubular form, the rsiliency of the strap form and the strength of connection with the blade and the advantages of the open back form and to eliminate all the objectional features of all three, which object, among others is accomplished by the construction hereinafter more particularly set forth and claimed.

Figure 1:
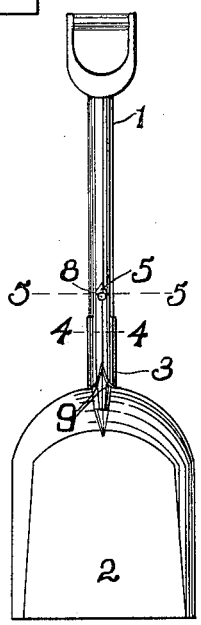
Figure 2:
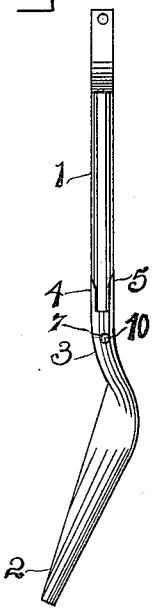
Figure 3:
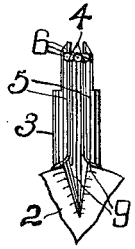
Figure 4:
Figure 5:
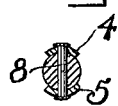
Figure 6:
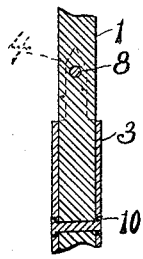

In the accompanying drawings forming part of this application: Figure 1 represents a back elevation of a shovel embodying my invention, the edges 9 of the ferrule 3 and strap 5 being welded or brazed together; Fig. 2, a side elevation of the same; Fig. 3, an enlarged rear detail view of the ferrule slightly opened as before welding, and the proximate part of the shovel blade, broken away; Figs. 4 and 5 represent respectively enlarged cross-sections on the lines 4—4 and 5—5 of Fig. 1; and Fig. 6 represents an enlarged central vertical section from side to side, broken away, of the lower part of the handle, the ferrule and the rivets, the raised front strap 4 appearing in dotted lines.

Referring now to the drawings in detail, 1 designates the handle preferably of wood, though it may be of any other suitable material, and 2 designates the steel blade of usual form provided with a heavy tempered edge.

The ferrule 3 is stamped out integral with the blade 2, as in the case of the ordinary open back, with the distinction that it is of different form, having two projecting straps 4 and 5 projecting from the upper edge of the ferrule and adapted to be applied to the front and rear respectively of the handle 1. By reason of the fact that the ferrule is of the open back type and of the great desirability of having the straps 4 and 5 applied to the front and back respectively of the handle 1, it is necessary in stamping out the strap 5 to stamp out one half on the top edge of the ferrule near and at each side of the two vertical edges 9 of the ferrule, so that these edges are extended up dividing the strap 5 in half. Of course it is apparent that the strap 5 might be stamped out of slightly different forms or shapes to avoid this, but the above is the preferred form and further it is not thought that any other form would be as strong. This ferrule is further provided with two or more sets of perforations 6 and 7, the perforations 6 being near the tops of straps 4 and 5 and passing through the longitudinal centers thereof and the perforations 7 being near the bottom of, and in each side of the ferrule 3, so that the rivet 10 passing through perforations 7 will run in the direction of the top edge of the shovel blade and at right angles to rivet 6 which passes through perforations 8 in the straps. The object in having the upper rivet pass from front to rear and the lower rivet pass from side to side is that the wood is weakened less in the direction of strain by having the rivet pass from front to rear and in the case of the lower rivet to strengthen that part of the ferrule just above the blade where the welded parts first meet. Of course more rivets than the number shown in the drawings may be used if desired, having in mind the desired effect, but two is the usual number.

The operation is substantially as follows: The shovel blade and ferrule integral therewith and of the shape set forth are stamped out. The perforations 6 and 7 may now be punched in this blank or after it has been formed up and welded. Next the ferrule is formed up and welded with a taper as usual. The handle 1 is then turned on a taper corresponding with the taper of the interior of said ferrule and forced into the ferrule to a point where the taper of the ferrule and handle make an absolutely perfect fit, the rivets 8 and 10 arranged as above described are then put in and the handle and ferrule at the top are smoothed down.

By the above construction I retain in this one form of shovel the advantage of the upper rivet running from front to rear, the advantage of the lower rivet running from side to side to strengthen the weld, the advantage of the tubular ferrule in carrying the strain sidewise in the steel of the ferrule, the advantage of the resiliency of the strap form and the advantage of the open back form having the ferrule and blade proper integral.

Having thus described my invention, what I claim as new and desire to secure by Letters Patent is:

1. A spade or shovel having a blade and a ferrule for attaching the handle thereto, said ferrule being provided with two raised straps respectively at the front and rear of the handle, the rear strap being longitudinally divided by the meeting line or seam of the ferrule, the latter being fastened on said handle by additional means.

2. A spade or shovel blade having a ferrule which opens at the back and is integral therewith, said ferrule being provided with front and back straps and adapted to receive the handle, the latter being secured therein by two transverse fastening devices passing through said ferrule and handle at right angles to each other.

3. A ferrule for connecting the blade and handle of a shovel or spade, having a front and rear strap integral with said ferrule, said rear strap being longitudinally divided by the meeting seam, where the edges of the ferrule are welded together.

4. A blade and ferrule in one piece for attachment to a handle, said ferrule having front and rear straps raised above the body thereof and a longitudinal seam at the rear of said ferrule where its longitudinal edges are welded together.

5. A blade and ferrule in one piece, said ferrule having front and rear straps raised above the body thereof and a longitudinal welding seam in its rear, in combination with a shovel handle the end of which is received in said ferrule and a fastening device passed through said straps and handle in line with the strain of work.

6. A blade and ferrule in one piece, said ferrule having front and rear straps, the latter being longitudinally divided by the welding seam, a handle received by said ferrule, a rivet passing laterally through said handle and ferrule and another rivet passing through said handle and straps on the line of the seam, substantially as shown.

In testimony whereof, I have signed my name to this specification in the presence of two subscribing witnesses.

GEORGE W. BENTON.

Witnesses:
CLAIRE MARCY,
H. G. KINGDOM.